United States Patent
Hurley

[15] 3,661,607
[45] May 9, 1972

[54] REDUCTION OF DUSTINESS AND ABRADING OF SOFT POROUS LOW DENSITY HYDRATED CALCIUM SILICATE PRODUCTS

[72] Inventor: Elmer Brewington Hurley, Martinsville, N.J.

[73] Assignee: Johns-Manville Corporation, New York, N.Y.

[22] Filed: Mar. 31, 1970

[21] Appl. No.: 24,328

[52] U.S. Cl. ................................106/272, 117/123, 252/88
[51] Int. Cl. .......................................................C08h 9/06
[58] Field of Search ....................106/272, 271, 270; 252/88; 117/123, 126 AO; 23/110 R

[56] References Cited

UNITED STATES PATENTS 3,007,812  11/1961  Smith et al. ..........................117/123 G
2,504,920   4/1950  Buckman et al. ....................117/123 C
3,257,220   6/1966  Kalousek..............................23/110 R

*Primary Examiner*—Theodore Morris
*Attorney*—John A. McKinney and Robert M. Krone

[57] ABSTRACT

Means of diminishing surface dusting in porous low density hydrated calcium silicate bodies and improving resistance to abrasion and crumbling of their soft, friable texture by depositing thereon a high temperature melting wax, and the dust-free and more durable wax containing hydrated calcium silicate products.

10 Claims, No Drawings

3,661,607

REDUCTION OF DUSTINESS AND ABRADING OF SOFT POROUS LOW DENSITY HYDRATED CALCIUM SILICATE PRODUCTS

BACKGROUND OF THE INVENTION

Low density hydrated calcium silicate materials such as have commonly long been employed as thermal insulations, high temperature resistance construction materials, safe fillers, flame resistant partition barriers, and related products, are of relatively soft and highly porous compositions presenting a friable and loosely coherent texture which is dusty upon handling, abrades or crumbles to powder thereby creating a health hazard as well as the other undesirable effects of dust, and is lacking desirable durability in being especially susceptible to abrasion, chipping, and general breakage.

SUMMARY OF THE INVENTION

This invention comprises a method of reducing dustiness and increasing durability of soft and porous, low density hydrated calcium silicates, and the improved product having substantially dust-free surfaces of superior resistance to abrasion, crumbling, chipping and breakage attained through the application of a wax having a high temperature melting point.

It is the primary objective of this invention to improve the handling characteristics of typical low density bodies comprising hydrated calcium silicates in effectively reducing their surface dusting and tendency to abrade or crumble into powder, minimize any potential health danger through dust inhalation or contact, and enhance their durability and resistance to abrasion, chipping, and breakage.

DESCRIPTION OF THE PREFERRED EMBODIMENT

This invention provides means of enhancing the handling and durability of relatively light weight bodies comprising hydrated calcium silicate compositions which have for many years been commonly utilized as thermal insulating materials, among many other related applications in the art. These hydrated calcium silicates are normally produced by a heat induced reaction between lime and silicate in the presence of water or water vapor wherein the lime and silicate and water combined in varying proportions and in turn produce various compositions depending, for example, upon the relative ratio of reactive ingredients and the degree of their reactivity, the time and temperature of the reaction, all pursuant to well-known and understood knowledge of the art. To provide optimum insulating properties and resistance to high temperatures, etc., the hydrated calcium silicate products are generally formed in relatively low densities and in turn a very high degree of porosity, as is evident from the substantial weight of the ingredients in relation to the weight of the body of the product, for example, product densities of between about 5 and about 30 pounds per cubic foot, and typically about 8 to 16 pounds per cubic foot for common commercial thermal insulations. To strengthen the generally weak and loosely coherent consistency due to such high porosity or limited structural matrix of these materials, reinforcing fibrous materials are typically included, such as asbestos, glass fiber or the like staple fibers having temperature resistance commensurate with the intended application. The fibrous reinforcement, although significantly enhancing the flexural strength and other structural strength requirements, nevertheless does not particularly contribute to composition hardness and in turn resistance to fine particles or dust being abraded therefrom, or their generally dusty nature. A typical calcium silicate thermal insulation product of the type to which this invention is directed comprises that disclosed in U.S. Pat. No. 2,699,097 to Binkley, and related prior art patent disclosures.

In carrying out this invention, the low density hydrated calcium silicate materials are treated by applying to their surface, and in particular the exterior product surface with regard to their intended application, a wax having a high temperature melting point and in the form of emulsion with water being the continuous phase. In applying the wax emulsified in water to the open and porous surface of the low density hydrated calcium silicate material, the water is drawn down into the fine interstices of the calcium silicate matrix by the wicking affect of capillary action leaving the wax material deposited noncontinuously on the surface and just within open pores immediately adjacent thereto. The wax thus applied does not form a continuous or impervious coating but an interrupted and porous deposition. To achieve an effective noncontinuous deposition and optimum application the oil-in-water type emulsion of wax should be about 20 to about 30 percent by weight of the wax solids of the total emulsion weight. The suspending water content of the emulsion can thereafter be removed from the material back through the discontinuous wax deposition by normal evaporation at ambient conditions, or removal accelerated by exposure to elevated temperatures or dry atmosphere.

To perform effectively the wax must be of a relatively high melting point of at least about 170° F. Further, it should be applied in amounts of about 0.1 gram to about 0.5 gram of wax solids per square foot surface area for a typical hydrated calcium silicate composition texture of a density of about 10 to 14 pounds per cubic foot. Suitable waxes of apt properties for use in this invention include, but are not limited to, montan wax, a mineral wax melting at about 184° F.; vegetable waxes comprising ouricury wax (M.P. 179°–183° F.), palm wax (M.P. 170°–175° F.), and sugar cane wax (M.P. 165°–180° F.); or castorwax, a synthetic material produced by the hydrogenation of castor oil, with a melting point of about 187° F. Montan wax is preferred.

Application techniques include any suitable means of handling and applying oil-in-water type emulsions such as commercial spray devices, brushing or simple immersion and the like routine means of administering a liquid. Spray application is preferred since the amounts applied can more easily be controlled and economically maintained at approximately the minimum effective proportion of about 0.1 gram of wax per square foot surface area whereas immersion application typically results in higher and thus less economical deposition in proportions of about 0.5 gram of wax per square foot of surface area.

In a typical application of this invention, hydrated calcium silicate product sold under the Johns-Manville Corporation trademark of "THERMOBESTOS," and produced pursuant to the technique of the aforesaid Binkley U.S. Pat. No. 2,699,097 in the form of the usual half sections of cylindrical pipe insulation units of a highly porous consistency of an approximate 11 pounds per cubic foot density mass, were treated on their outer peripherial surface as follows. An emulsion of montan wax in a continuous water phase containing approximately 25 percent by weight of wax solids based upon the total emulsion, was spray applied to the outer peripherial surface of the hydrated calcium silicate half cylindrical sections in amount to deposit thereon about 0.1 gram per square foot surface area. The water content quickly wicked inwardly into the capillary like interstices leaving on the surface a discontinuous or perforate wax deposition. The suspending water of emulsion was thereafter removed by air drying.

This relatively simple and economical treatment converted the treated surface of the otherwise highly dusty and crumbling to powder, soft and friable texture, to an essentially dust and powder-free condition which resisted abrading away of fine particles or dust, and affected a pronounced improvement in the durability of the surface withstanding abrading encountered in normal and even rough handling in contact with hard rough surfaces including a significant reduction in chipping and breakage in the otherwise relatively soft and friable material attributable to the very low density requirements for effective thermal insulating characteristics. This treatment is particularly significant and beneficial in overcoming the potential hazards of physical contact with asbestos and dust therefrom since asbestos is most commonly included in such products as reinforcement, and silica containing dust derived from the calcium silicate material itself.

I Claim:

1. A method of reducing dustiness and increasing durability in a soft and porous low density body comprising applying to the surface of a soft and porous low density hydrated calcium silicate body an emulsion of approximately 20 to approximately 30 percent by weight of wax solids in water, said wax having a melting point of at least about 170° F. and applied in amounts of about 0.1 to about 0.5 gram per square foot of surface area.

2. The method of claim 1 wherein the soft and porous body comprises hydrated calcium silicate of a density of from about 5 to about 30 pounds per cubic foot and wherein said wax is selected from the group consisting of montan wax, ouricury wax, palm wax, sugar cane wax and a wax produced by the hydrogenation of castor oil.

3. The method of claim 2 wherein the emulsion of wax in water is applied by spraying.

4. The method of claim 2 wherein the emulsion of wax is applied by immersion.

5. The method of claim 1 wherein the hydrated calcium silicate body is of a density of about 8 to about 16 pounds per cubic foot.

6. The method of claim 1 wherein the said wax is montan wax.

7. A soft and porous low density body comprising hydrated calcium silicate having on a surface thereof a noncontinuous deposition of wax having a melting point of at least about 170° F. and in amounts of about 0.1 to about 0.5 gram per square foot of said surface area.

8. The soft and porous low density body of claim 7 which comprises hydrated calcium silicate of a density of about 5 to 30 pounds per cubic foot and comprises up to about 25 percent of reinforcing asbestos fiber and wherein said wax is selected from the group consisting of montan wax, ouricury wax, palm wax, sugar cane wax and a wax produced by the hydrogenation of castor oil.

9. The soft and porous low density hydrated calcium silicate body of claim 7 which is of a density of about 8 to 16 pounds per cubic foot and comprises reinforcing fiber.

10. The soft and porous low density hydrated calcium silicate body of claim 7 wherein the wax applied is montan wax.

* * * * *